May 25, 1937.　　A. F. BEALS ET AL　　2,081,139
GAS ENGINE
Filed Nov. 20, 1933　　2 Sheets-Sheet 1

INVENTOR.
Albert F. Beals and
Elmer E. Pudge
BY
ATTORNEY.

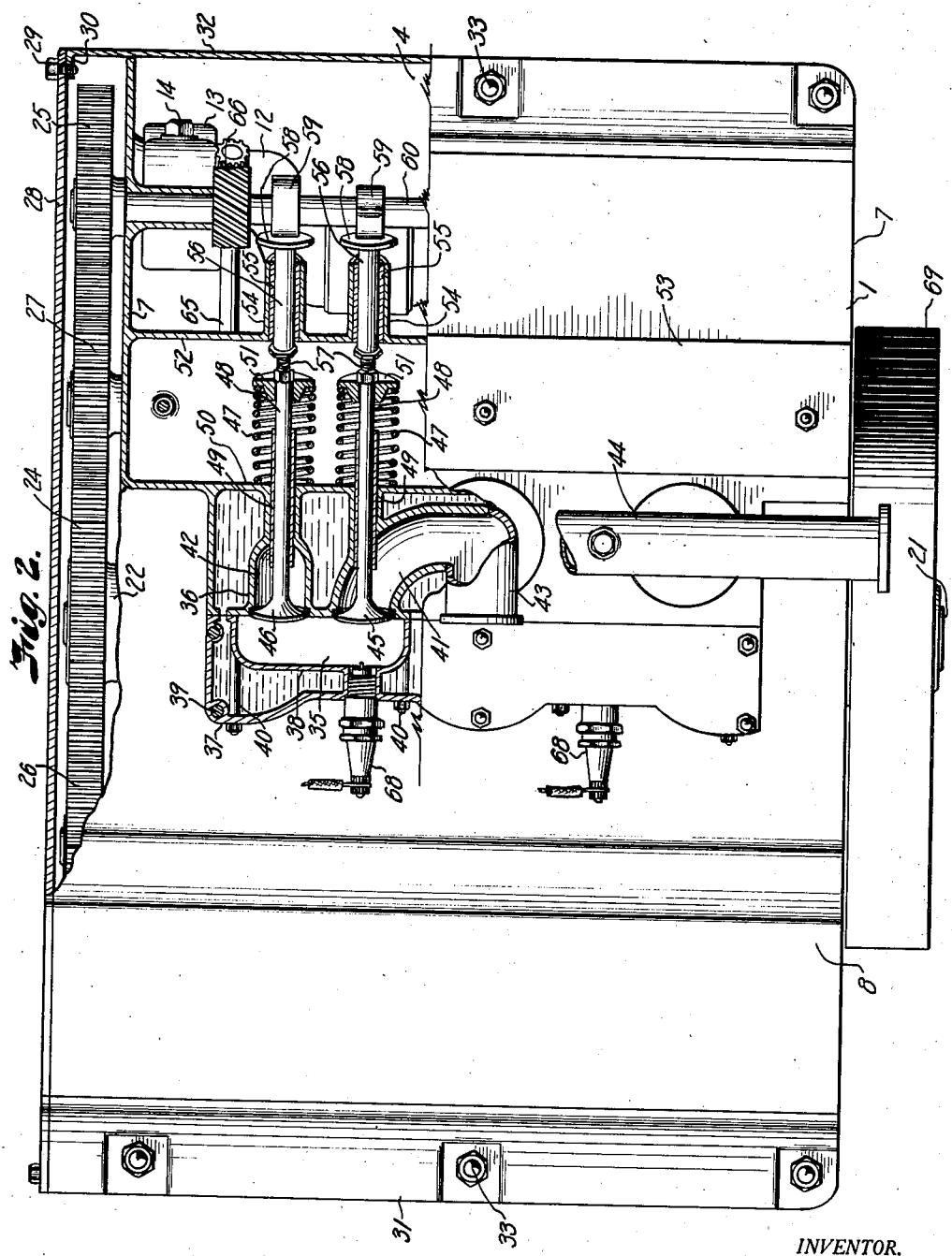

Patented May 25, 1937

2,081,139

UNITED STATES PATENT OFFICE 2,081,139

GAS ENGINE

Albert F. Beals, Kansas City, Mo., and Elmer E. Pudge, Salina, Kans., assignors to Universal Rotary Motors Company, Salina, Kans., a corporation of Kansas Application November 20, 1933, Serial No. 698,848

2 Claims. (Cl. 123—51)

Our invention relates to internal combustion engines and more particularly to engines of the four cycle type having opposed cylinders.

Although internal combustion engines have, through continued developments, been improved to the point where a high degree of efficiency is attained, a great deal of power created by explosion of the fuel gases is still lost, due principally to the position of the piston in relation to the crank when a charge is ignited and combustion occurs.

In internal combustion engines of conventional vertical design, the compressed fuel charge is ignited at the instant when the piston has moved to within a few degrees of top dead center, or its nearest approach to the cylinder head, so that the propelling power of the explosion will be effective on the piston throughout the greatest possible portion of piston travel. Obviously the maximum thrust of the explosion is thus exerted on the piston when it is in a line almost directly longitudinal with the crank on the crank shaft, resulting in strains, vibrations, and loss of power.

It will further be evident that the travel of the piston at each end of its stroke is comparatively slow and consequently a great deal of the explosive energy is dissipated in heat through the portion of the cylinder wall adjacent the combustion chamber.

As a further result of the relatively slow movement of the piston at the ends of its stroke, fuel is drawn at comparatively slow velocity into the combustion chamber during the intake stroke of the piston which necessitates the use of large valves, particularly in high speed engines.

The principal objects of our invention are, therefore, to utilize a large percentage of this loss of energy for rotating the crank shaft, and to incidentally reduce the strains and vibrations in the engine; to draw the fuel into the combustion chamber at a higher velocity; and to convert a greater portion of the expansive force of the exploded charge into mechanical energy before being dissipated in heat losses through the cylinder wall.

In accomplishing these and other objects of our invention, we have provided improved details of structure, the preferred form of which is illustrated in the accompanying drawings, wherein:

Fig. 2 is a plan view of the engine with portions shown in section to disclose a gear train for operably connecting spaced crank shafts and to show a combustion chamber and valve assembly of the engine.

Figure 1:
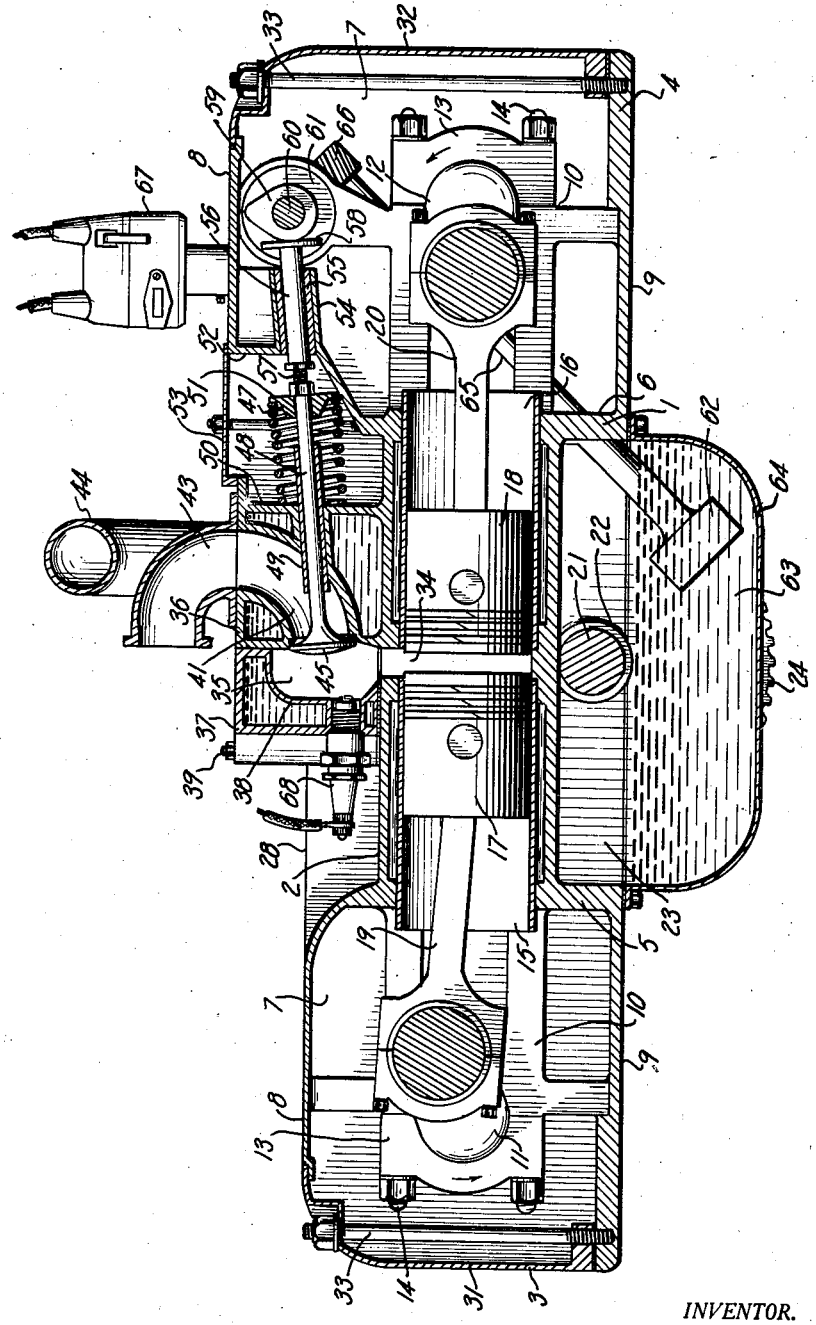
Fig. 1 is a longitudinal section of an engine constructed in accordance with our invention and disclosing a pair of cooperating crank-shafts, the crank of one shaft being positioned slightly in advance of the crank on the other shaft.

Referring more in detail to the drawings:

1 designates an engine block of the opposed cylinder type including a central cylindrical portion 2 terminating at its ends in respective crank cases 3 and 4 joined thereto by inner end walls 5 and 6.

The sides, tops and bottoms of the crank cases are closed by respective walls 7, 8 and 9; and bearing brackets 10 formed integrally with the end walls 5 and 6, and the top and bottom walls, serve to journal crank shafts 11 and 12 provided in the respective crank cases 3 and 4 and held in rotatable relation with the brackets by bearing caps 13 secured to the brackets by bolts 14 in the usual manner.

Mounted in the cylindrical portion 2 are sleeves 15 and 16 for slidably receiving respective pistons 17 and 18 connected by rods 19 and 20 to the spaced crank shafts 11 and 12.

In order to transmit power exerted on each of the pistons to a common driven member, a main or power shaft 21 is journalled on a transverse center line of the blocks in bearings 22 formed in a continuation 23 of the side walls 7 and is operably connected to the crank shafts by a main gear 24 fixed on the power shaft and rotatably connected with gears 25 on the crank shafts through idler gears 26 and 27.

The train of gears is preferably enclosed by an end plate 28 removably secured by cap screws 29 to inwardly flanged extensions 30 of cover or end plates 31 and 32 closing the outer ends of the crank cases and held in sealed engagement with the cases by bolts 33.

As is shown in Fig. 1, the cylindrical portion of the engine block is provided with an upper central port 34 communicating with a combustion chamber 35 defined by a valve housing 36 and by a head 37 having an inset wall 38 spaced from the housing and secured by vertical and horizontal bolts 39 and 40 to the engine block and valve housing respectively.

Provided in the valve housing are the usual intake and exhaust chambers 41 and 42 communicating respectively with intake and exhaust manifolds 43 and 44, and controlled by valves 45 and 46 normally held in seated position in the chambers by springs 47 sleeved over valve stem portions 48 slidably mounted in guides 49.

The valve springs are confined between an outer wall 50 of the valve housing and washers 51 secured on the valve stems in any approved manner, and the portion of the block containing the springs is segregated from the remainder of the block by the upper portion of the cylinder and by a partition wall 52 dividing the crank case 4 from the valve housing, the chamber thus formed for the valve springs being closed by a cover plate 53.

Formed integrally with the wall 52 are cylindrical bosses 54 extending into the crank case 4 for seating sleeves 55 in axial alignment with the valves adapted to slidably receive push rods 56 having adjustable contact with the ends of the valve stems as indicated at 57 and having opposite ends provided with heads 58.

The push rods are actuated in the usual manner for opening the valves by cams 59 fixed on a cam shaft 60 journalled in bearings 61 in the crank case 4 in parallel relation to the crank shaft 11.

Other conventional equipment for completing the engine structure includes an oil pump 62 mounted in an oil reservoir 63 provided by bolting a pan 64 to the lower edges of the side walls 7 and to the bottom walls 9, the pump being driven by a shaft 65 geared as shown at 66 to the cam shaft.

A distributor 67 is also driven from the cam shaft as in ordinary practice and spark plugs 68 are threaded into the head 37 for igniting compressed charges of gases. A pulley or fly wheel 69 may further be mounted on one end of the power shaft in accordance with common practice.

While the general arrangement of the opposed pistons, spaced crank-shafts, valves, etc., may not be materially different from similar engines previously invented, we accomplish the really important and novel results of our invention by so meshing the train of gears that one piston will begin its cycle of movements approximately twenty degrees in advance of its cooperating piston, as is illustrated in Fig. 1, and the effects of such an interconnection of the pistons and consequent operation of the engine is as follows:

Assuming that both pistons are at the inner ends of their strokes and are moving outwardly on the intake stroke, the piston 17, due to the advanced position of the crank on the shaft 11, will move faster than the piston 18 having its rod in longitudinal alignment with the crank on the shaft 12, and will consequently draw fuel through the inlet valve at a higher rate of speed than in the conventional engine of this type wherein the piston begins its movement with respect to the crank similarly to that of the piston 18.

Upon return strokes of the pistons the inlet valve closes and the charge of fuel is compressed within the combustion chamber and between the piston heads, it being apparent from the disclosure that a space is reserved between the heads of the pistons when they arrive at their inner limits of travel to produce a continuation of the combustion chamber.

The compressed fuel is now ignited by means of the plug and although the impact of the explosion strikes both piston heads, the piston 18 is momentarily stationary due to the longitudinal alignment of its rod with the crank on the shaft 12. The crank of the shaft 11, having already passed its inner dead center, therefore receives the initial impact of the explosion conveyed thereto through the piston 17 and rod 19 and in turn transmits this thrust without appreciable loss to the train of gears and the power shaft.

Immediately thereafter the piston 18 reaches a similar position with reference to the crank on the shaft 12 and the remaining force of the explosion is expended on the oppositely moving pistons and is transferred into rotary motion through both crank shafts.

Because of the comparatively rapid initial movement of the piston 17 on its power stroke and the immediately following movement of the piston 18, the force of the explosion is utilized for propelling the pistons before much of its energy can dissipate as heat into the cylinder walls, and as a result of the slightly advanced position of one piston in relation to the other, strains and vibrations in the engine are greatly reduced.

On the final or exhaust stroke, the spent gases escape through the opened exhaust valve into the exhaust manifold and because of the pistons moving rapidly toward each other a more complete scavenging of the cylinders is obtained than is possible in conventional engines having pistons moving toward a fixed cylinder head.

While we have shown an engine having a pair of parallel opposed pistons, it will be obvious that more pistons may be added in parallel rows for increasing the power of the engine.

What we claim and desire to secure by Letters Patent is:

1. In an engine of the character described, a cylinder having a lateral combustion chamber, opposed power pistons in the cylinder, means for admitting fuel to the lateral combustion chamber, a pair of crank shafts, one having its crank in advance of the other, connecting rods connecting the cranks with the respective pistons, and means interconnecting said crank shafts to effect operation of the crank shafts at the same speed and to effect differential movement of the power pistons relatively to the lateral combustion chamber.

2. In an engine of the character described, a cylinder having a lateral combustion chamber provided with inlet and outlet ports and a port communicating with the cylinder, valves controlling the respective inlet and outlet ports, opposed power pistons reciprocable in the cylinder, a pair of crank shafts, one having its crank in advance of the other, connecting rods connecting the cranks with the respective pistons, and means interconnecting the crank shafts to effect operation of the crank shafts at the same speed to differentially reciprocate the pistons to and from said port connecting the combustion chamber with the cylinder.

ALBERT F. BEALS.
ELMER E. PUDGE.